United States Patent [19]

Sellon

[11] 4,445,865

[45] May 1, 1984

[54] METHOD OF TEACHING MATHEMATICS

[75] Inventor: Jeffrey Sellon, Pound Ridge, N.Y.

[73] Assignee: Cuisenaire Company of America, Inc., New Rochelle, N.Y.

[21] Appl. No.: 458,064

[22] Filed: Jan. 14, 1983

[51] Int. Cl.³ .......................................... G09B 19/02
[52] U.S. Cl. .................................. 434/207; 434/209; 434/210
[58] Field of Search ............... 434/191, 207, 209, 210, 434/195

[56] References Cited

U.S. PATENT DOCUMENTS

| | | | |
|---|---|---|---|
| 2,656,618 | 10/1953 | Pescatori | 434/209 X |
| 3,204,343 | 9/1965 | Pollock | 434/195 |
| 3,735,504 | 5/1973 | Fedyna | 434/209 X |
| 4,372,742 | 2/1983 | Wentworth | 434/207 X |

FOREIGN PATENT DOCUMENTS 1031272 6/1966 United Kingdom ............... 434/210

Primary Examiner—William H. Grieb
Attorney, Agent, or Firm—Kane, Dalsimer, Kane, Sullivan and Kurucz

[57] ABSTRACT

A method is provided for teaching and learning multiplication wherein unit power of ten values are assigned to strips of transparent material. The strips are positioned on a multiplication table array over the rows and columns representing the digits of the numbers to be multiplied. The color of the strip determines the unit value of the digits. By multiplying the value of each array element on that intersection of two strips by the unit value of the composite color formed by the overlying of the two strips and summing the products of the digit values and the unit values the final value of the numbers to be multiplied is obtained.

2 Claims, 1 Drawing Figure

U.S. Patent
May 1, 1984
4,445,865
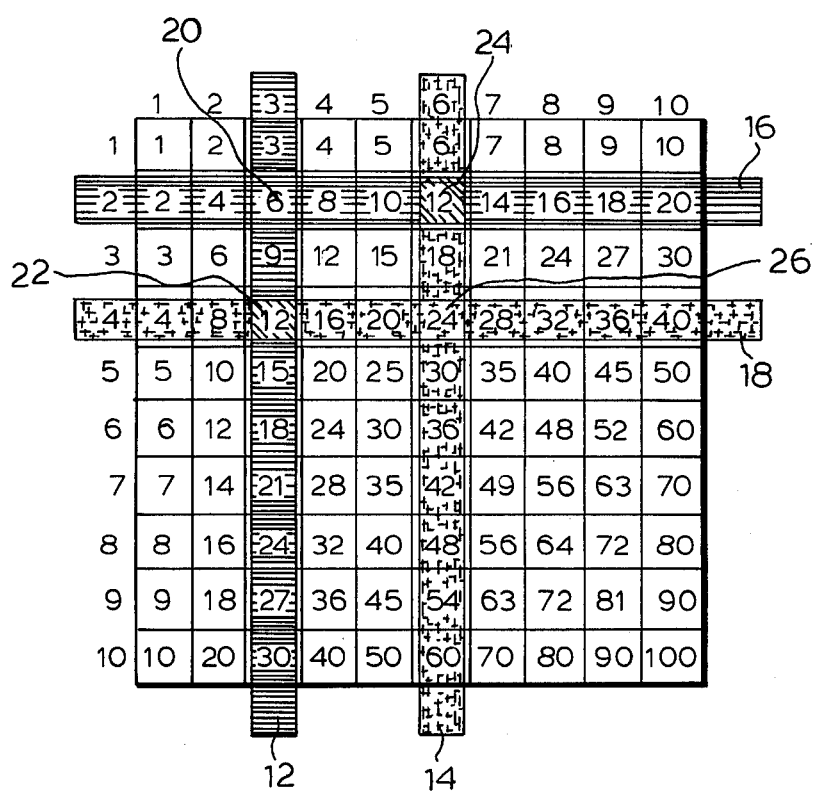

METHOD OF TEACHING MATHEMATICS

BACKGROUND OF THE INVENTION

The present invention relates to teaching methods and in particular to a method for teaching the elementary mathematical relationship necessary for an understanding of multiplication.

To understand multiplication, a student must grasp two concepts. First, the student must master the common product table. This is usually done by rote in the early elementary school grade and permits multiplication as far as the table is expanded. In order for the student to multiply multi-digit numbers he must grasp the concept of units comprising expanded (and contracted) powers of ten. That is, the first digit (to the left of the decimal point) is the "ones" unit, the next digit is the "tens" unit, the next digit is the "hundreds" unit, and so on. For the student to master multiplication he must appreciate that one "ten" is equivalent to ten "ones", one "hundred" is equivalent to "ten" tens or a hundred "ones" and so on. Thus, $5 \times 12$ can be expressed as 5 ones multiplied by the sum of one ten and two ones. The product may be expressed as six tens or sixty ones.

It is the principal object of the present invention to provide an improved technique for the teaching of multiplication and particularly the unit concept.

A further object is to provide such a technique which utilizes a simple and inexpensive teaching aid which is easily mastered by a student.

SUMMARY OF THE INVENTION

The above and other beneficial objects and advantages are attained by teaching multiplication utilizing a multiplication table comprising a series of horizontal rows of sequential numbers and vertical columns of sequential numbers. The products of the numbers are set forth in a conventional array to produce the well known multiplication table. Transparent colored overlay strips are provided with a particular color of the transparency corresponding to a particular unit value. The width of each strip is substantially equal to one element of the array and the length is equal to the total length of the array. By placing one strip along a column and another along a row, the product of the value of the column and the value of the row is that number within the array under the intersecting strips. The unit value of the product is determined by the composite color that appears over the answer. The composite color, in turn, is determined by the individual colors of the intersecting strips. This permits the student to simultaneously determine the numerical value of the product as well as the unit value of the components of the product.

By selecting proper colors for the transparencies (such as yellow and blue for example) the composite (green) may readily be spotted.

BRIEF DESCRIPTION OF THE DRAWINGS

The accompanying drawing is a top plan view of a multiplication chart having color overlay strips thereon to be used in accordance with the present invention.

DETAILED DESCRIPTION OF THE PREFERRED EMBODIMENT

The method of teaching multiplication in accordance with the present invention may best be understood with reference to the drawing. In accordance with the present invention a product table 10 is provided. The table 10 consists of columns numbered 1-10 sequentially extending vertically and rows numbered 1-10 sequentially extending horizontally. The products of the rows and column are set forth in the square array of numbers defined by the rows and columns.

Transparent strips 12 and 14 are provided for movement along the columns (in the manner to be described) and identical strips 16 and 18 are provided for movement along the rows. The array elements are all of the same size and each of the strips is as wide as the elements of the array and slightly longer than the length of the array.

The vertical strips are of different colors, preferably primary colors. The horizontal strips are of the same colors. In a preferred embodiment where four strips were employed each set consisted of one blue and one yellow strip.

In accordance with the present invention, each strip color is assigned a unit value. For example, yellow represents the "ones" unit and blue the "tens" unit. For multiplying two "ones" an intersection of yellow and yellow remains yellow. Mathematically this represents "ones"×"ones" which equals "ones".

An intersection of yellow and blue produces green. Mathematically this represents "ones"×"tens" or "tens"×"ones" both of which equal "tens".

An intersection of blue and blue remains blue. Mathematically this represents "tens"×"tens" which equals "hundreds".

In the illustrated embodiment 36 is being multiplied by 24. 36 is represented by blue vertical strip 12 overlying the "3" column and yellow vertical strip 14 overlying the "6" column. This represents 3 tens and 6 ones. Similarly, 24 is represented by blue horizontal strip 16 overlying the "2" row and yellow horizontal strip 18 overlying the "4" row. As shown, the intersecting strips produce the following overlap: blue at the "6" in array element 20; green at the "12" in array element 22 and the "12" at array element 24; and yellow at the "24" at array element 26. This represents:

|     |                        |     |
| --- | ---------------------- | --- |
| (a) | $6 \times 100 =$       | 600 |
| (b) | $(12 + 12) \times 10 =$| 240 |
| (c) | $24 \times 1 =$        | 24  |

This product is thus 8 6 4 the sum of a, b and c.

Note, had the yellow been the "tens" and the blue the "ones" then the multiplication would have been $63 \times 42$ and the color product would have consisted of:

|                         |                |
| ----------------------- | -------------- |
| $24 \times 100 =$       | 2400 (yellow)  |
| $(12 + 12) \times 10 =$ | 240 (green)    |
| $6 \times 1 =$          | 6 (blue)       |

This product is 26 4 6.

It should also be noted that by adding additional colors additional unit values may be added. For example, a red strip having the "hundreds" unit value may be used. This would produce a purple overlay with blue having a value "thousands" ($100 \times 10$) and an orange overlay with yellow having a value of "hundreds" ($100 \times 1$). A red and red intersection will produce red having a value of "ten thousands" ($100 \times 100$).

In a similar manner unit values to the right of the decimal point may be assigned.

As can be seen, the color change (or lack of change) produced by the overlap of transparent color strips dramatically illustrates the unit values generated during multiplication. The teaching aid required is a simple product table and several transparent strips.

Thus, in accordance with the above, the aforementioned objects are attained.

Having thus described the invention, what is claimed is:

1. A method for teaching and learning multiplication comprising:

assigning unit power of ten values to strips of transparent material, each unit value comprising a different color and the composite color formed by one colored strip overlying another colored strip comprising the product of the unit value of said strips;

positioning said strips on a multiplication table array over the rows and columns representing the digits of the numbers to be multiplied and the color of the strip determining the unit values of said digits;

multiplying the digit value of each array element under an intersection of two strips by the unit value of the composite color formed by the overlying of said two strips; and, summing the products of the digit values and the unit values to obtain the final value of the numbers being multiplied.

2. The method in accordance with claim 1 wherein said strips are of primary colors.

* * * * *